United States Patent
Qi et al.

(10) Patent No.: US 11,783,601 B2
(45) Date of Patent: Oct. 10, 2023

(54) DRIVER FATIGUE DETECTION METHOD AND SYSTEM BASED ON COMBINING A PSEUDO-3D CONVOLUTIONAL NEURAL NETWORK AND AN ATTENTION MECHANISM

(71) Applicant: Nanjing University of Science and Technology, Nanjing (CN)

(72) Inventors: Yong Qi, Nanjing (CN); Yuan Zhuang, Nanjing (CN)

(73) Assignee: Nanjing University of Science and Technology, Nanjing (CN)

( * ) Notice: Subject to any disclaimer, the term of this patent is extended or adjusted under 35 U.S.C. 154(b) by 495 days.

(21) Appl. No.: 17/043,681

(22) PCT Filed: Aug. 18, 2020

(86) PCT No.: PCT/CN2020/109693
§ 371 (c)(1),
(2) Date: Sep. 30, 2020

(87) PCT Pub. No.: WO2021/248687
PCT Pub. Date: Dec. 16, 2021

(65) Prior Publication Data
US 2023/0154207 A1    May 18, 2023

(30) Foreign Application Priority Data
Jun. 10, 2020    (CN) ........................... 202010522475.2

(51) Int. Cl.
*G06F 9/00* (2018.01)
*G08B 21/18* (2006.01)
(Continued)

(52) U.S. Cl.
CPC .......... *G06V 20/597* (2022.01); *G06V 10/7715* (2022.01); *G06V 10/776* (2022.01);
(Continued)

(58) Field of Classification Search
CPC ... G06V 20/597; G06V 20/49; G06V 10/7715;
(Continued)

(56) References Cited

U.S. PATENT DOCUMENTS

2019/0244108 A1    8/2019    Meyerson et al.

FOREIGN PATENT DOCUMENTS

| CN | 110378281 A | 10/2019 | |
| CN | 110427807 A * | 11/2019 | .................. G06F 18/24 |

(Continued)

OTHER PUBLICATIONS

Lei et al, "Infant Brain MRI Segmentation with Dilated Convolution Pyramid Downsampling and Self-attention", 2019, arXiv preprint arXiv:1912 (9 Pages) (Year: 2019).*

(Continued)

*Primary Examiner* — David F Dunphy
(74) *Attorney, Agent, or Firm* — Bayramoglu Law Offices LLC

(57) ABSTRACT

A driver fatigue detection method based on combining a pseudo-three-dimensional (P3D) convolutional neural network (CNN) and an attention mechanism includes: 1) extracting a frame sequence from a video of a driver and processing the frame sequence; 2) performing spatiotemporal feature learning through a P3D convolution module; 3) constructing a P3D-Attention module, and applying attention on channels and a feature map through the attention mechanism; and 4) replacing a 3D global average pooling layer with a 2D global average pooling layer to obtain more expressive features, and performing a classification through a Softmax classification layer. By analyzing the yawning behavior, blinking and head characteristic movements, the yawning behavior is well distinguished from the talking behavior, and it is possible to effectively distinguish between the three states of alert state, low vigilant state and drowsy state, thus improving the predictive performance of fatigue driving behaviors.

20 Claims, 3 Drawing Sheets

(51) Int. Cl.
    *G06V 20/59* (2022.01)
    *G06V 20/40* (2022.01)
    *G06V 10/82* (2022.01)
    *G06V 10/776* (2022.01)
    *G06V 10/77* (2022.01)

(52) U.S. Cl.
    CPC .............. *G06V 10/82* (2022.01); *G06V 20/46* (2022.01); *G06V 20/49* (2022.01); *G08B 21/18* (2013.01)

(58) Field of Classification Search
    CPC ....... G06V 20/46; G06V 10/82; G06V 10/776; G08B 21/18
    See application file for complete search history.

(56) References Cited

FOREIGN PATENT DOCUMENTS

| | | |
|---|---|---|
| CN | 111428699 A | 7/2020 |
| EP | 0582236 A1 | 2/1994 |

OTHER PUBLICATIONS

Ying Wang, Research and Implementation of Action Detection Based on Joint Deep Learning, A Master Thesis Submitted to University of Electronic Science and Technology of China, 2019, 78 pages.

\* cited by examiner

P3D-Attention-A 128   P3D-Attention-B 256   P3D-Attention-C 256

DRIVER FATIGUE DETECTION METHOD AND SYSTEM BASED ON COMBINING A PSEUDO-3D CONVOLUTIONAL NEURAL NETWORK AND AN ATTENTION MECHANISM

CROSS REFERENCE TO THE RELATED APPLICATIONS

This application is the national phase entry of International Application No. PCT/CN2020/109693, filed on Aug. 18, 2020, which is based upon and claims priority to Chinese Patent Application No. 202010522475.2, filed on Jun. 10, 2020, the entire contents of which are incorporated herein by reference.

TECHNICAL FIELD

The present invention relates to the technical field of intelligent video analysis, and more particularly, to a driver fatigue detection method and system based on combining a pseudo-three-dimensional (P3D) convolutional neural network (CNN) and an attention mechanism.

BACKGROUND

Fatigue driving is one of the major causes of traffic accidents. Drivers in fatigue state often feel drowsy and have transient loss of consciousness, which impairs their alertness. Moreover, a driver who experiences fatigue while driving is less likely to have the capacity to react to sudden events, reflect traffic control and dangerous events, which all lead to motor vehicle accidents. The American Automobile Association (AAA) reported that 7% of all motor vehicle accidents and 21% of fatal traffic accidents were caused by fatigue drivers, indicating that fatigue driving constitutes the largest proportion of road traffic accidents. Prior art methods for detecting fatigue driving behavior can be divided into three types: physiological parameters based detection method, vehicle behavior based detection method and facial feature analysis based detection method.

The physiological parameters based detection method requires a variety of sensors to have contact with the driver's body, and determines whether the driver is in the fatigue state based on the detection of different physiological signals, such as, electrocardiography (ECG) and/or electroencephalogram (EEG), the currently known systems that have been used in this method are, for example, electromyography (EDA), Respiration and ECG. In general, physiological parameters based detection method has high fatigue driving detection accuracy, but it relies on experimental equipment and is considered invasive, which limits its application range. The vehicle behavior based detection method uses vehicle behavior parameters, such as lane departure, steering wheel angle (SWA) and yaw angle (YA) to detect fatigue driving behavior. Similar to physiological parameters based detection method, this method also depends on external factors such as road conditions.

The facial feature analysis based detection method extracts the facial feature points of the driver, compares the fatigue state and the normal state of the driver, and detects the fatigue behavior characteristics of the driver such as head movement posture, eye state (blinking) and yawning. This method outperforms the above two methods in its advantages of being non-invasive and its easy implementation. One proposed method requires continuous recording of a driver's eyelid movement through infrared sensors and studying the effectiveness of spontaneous blinking parameters. This proposed method determines the sub-components of blinking duration, namely the closing time and reopening time are investigated. Studies have shown that the blinking duration and reopening time change reliably with increasing drowsiness. By evaluating the performance of the latest in-vehicle fatigue prediction measures based on tracking the driver's eye movements, including marking blinking candidates that meet the criteria (minimum/maximum duration, shape, and minimum amplitude) as valid blinks. Facial recognition algorithm is also used based on edge detection and texture measurement to segment the eyes and calculate the eye features that change over time. This method obtains 95.83% effectiveness under high illumination, and 87.5% effectiveness under medium illumination. The human face extraction system uses a support vector machine (SVM) based on facial extraction and a mouth detection method based on circular Hough transform (CHT) to detect the movement around the driver's mouth area in determining the fatigue state of the driver based on the opening degree of the driver's mouth. The above methods depend on artificial features, and often, these methods are unable to thoroughly explore the complex relationship between different visual cues. Additionally, these methods ignore the fact that the eyes and the mouth may be occluded, the yawning time and opening degree of the mouth vary from person to person, and do not consider the driver's facial expression changes and head movement posture, etc.

Different from the above artificial feature based facial feature analysis and detection methods, a CNN based image spatial feature extraction system and a long short-term memory (LSTM) based image temporal feature analysis system use LSTM to integrate information on the time series to obtain the optimal determination performance, and the frame-level CNN feature output is aggregated into video-level features for prediction. The study results show that the yawning detection obtains an accuracy rate of over 87% when performed on a continuous video. A method performs transfer learning on a trained Inception-v3 model, uses the trained Inception-v3 model to extract spatial features, the extracted spatial features are then input into the LSTM layer to integrate the temporal features for the prediction of the fatigue state. The multi-CNN-based driver activity detection model uses a Gaussian mixture model to segment the original image and extracts the driver's physical features from the background. This model can effectively determine whether the driver is distracted, and its accuracy rate can reach 91.4%. These methods are more robust than the artificial feature based methods and better capture the relationship between different cues. However, due to the use of GoogleNet, and Inception-v3 model for spatial feature extraction, the prediction model has massive parameters and contains a large amount of redundant spatial data. The convolutional spatial features are converted into a one-dimensional (1D) vector and input into the time series model, without considering the spatial correlation and without removing the interference of the background and noise on recognition. As a result, the temporal and spatial features cannot be well integrated.

SUMMARY

1. Objective

An objective of the present invention is to improve the performance of fatigue driving prediction, including provide a driver fatigue detection model based on combining a pseudo-three-dimensional (P3D) convolutional neural network (CNN) and an attention mechanism. The present invention creates a P3D-Attention module based on the decoupling of spatial and temporal convolutions by a P3D module, which is respectively integrated with a spatial attention (SA) module and a dual-channel attention model (DCAM) that are adaptive, thereby fully integrating the spatiotemporal features. Thereby improving the correlation of important channel features and increasing the global correlation of feature maps.

2. Technical Solution

The present invention discloses a driver fatigue detection method based on combining a P3D CNN and an attention mechanism, including:
- a step of extracting a frame sequence from a video;
- a step of performing spatiotemporal feature learning through a P3D convolution module;
- a step of constructing a P3D-Attention module, and applying attention on channels and a feature map through the attention mechanism;
- a step of applying attention on a time frame and a space frame through a dual-channel attention model (DCAM) to strengthen key frames; automatically assigning different attention to different joint points according to the feature map, paying attention to a position mentioned in the prior knowledge, and removing interference of a background and noise on recognition; the attention mechanism being expressed as:

$$F' = M(F) \otimes F \quad (1)$$

where, M represents the attention module, and F represents the feature map; and $\otimes$ represents element-wise multiplication of the matrix; and
- a classification step.

Further, the DCAM applies attention between video frames and on channels of each frame; the feature map is $F \in R^{(F \times H \times W \times C)}$, where F in R represents the number of frames; C represents the number of channels in each frame; H and W represent features under different channels; a weight of $M_c \in R^{(F \times 1 \times 1 \times C)}$ is learned to determine the importance of each channel; the feature map with a size of (F,H,W,C) is transposed into (H, W, F×C), and (H, W, F×C) is combined with a two-dimensional (2D) spatial attention (SA) module; weights of $M_c \in R^{(F \times 1 \times 1 \times 1)}$ and $M_c \in R^{(1 \times 1 \times 1 \times C)}$ are respectively learned to express attention on the frame and channel.

Further, the 2D SA module uses a 2D convolution kernel to obtain a weight map of a feature layer in a spatial dimension; a SA module of $F \in R^{(F \times H \times W \times C)}$ learns a weight of $M_s \in R^{(1 \times W \times H \times 1)}$ to determine the importance of each feature map.

Further, on the basis that the P3D module decouples a 3D convolution into a spatial and temporal convolution, the attention module is divided into three different P3D-Attention modules to obtain a network model;

P3D-Attention-A: a temporal 1D convolution kernel T is cascaded to a spatial 2D convolution kernel S, a SA module is cascaded after S, and a channel attention (CA) module is cascaded after T, to obtain a P3D-Attention-A architecture; the temporal 1D convolution kernel T is directly connected to a final output, as shown in Equation (2):

$$(CA \cdot T \cdot SA \cdot S) \cdot X_t = CA(T(SA(S(X_t)))) = X_{t+1} \quad (2)$$

where, $X_t$ represents an input feature map; $X_{t+1}$ represents an output obtained after the attention mechanism is applied; $X_t$ and $X_{t+1}$ have the same feature dimension;

P3D-Attention-B: an original P3D-B module uses an indirect influence between two convolution kernels, so that the two convolution kernels process convolution features in parallel; after a residual unit (RU) is removed, a SA module is cascaded after S, and then a CA module is cascaded after T, which is expressed as follows:

$$(SA \cdot S + CA \cdot T) \cdot X_t = SA(S(X_t) + CA(T(X_t))) = X_{t+1} \quad (3)$$

P3D-Attention-C: an original P3D-C module is a compromise between P3D-A and P3D-B, through which a direct influence between S, T and the final output is simultaneously established; in order to achieve a direct connection between S and the final output based on the cascaded P3D-A architecture, an attention module is introduced to construct the P3D-Attention-C, which is expressed as:

$$(SA \cdot S + CA \cdot T \cdot SA \cdot S) \cdot X_t = SA(S(X_t) + CA(T(SA(S(X_t))))) = X_{t+1} \quad (4)$$

and
the attention mechanism assigns different weights to different channels and features; after several convolutions, the spatial and temporal feature information is fused to obtain key features, and a 3D max pooling layer is cascaded after the P3D-Attention-A module for down sampling.

Further, the classification step includes:
introducing a 2D global average pooling (GAP) layer after the P3D-Attention module; wherein after the video frame passes through three P3D modules and three P3D-Attention modules, the features are input into the 2D GAP layer after being transposed, and finally the features are input into Softmax and classified.

Further, the classification step specifically includes:
replacing a fully connected layer with the GAP layer; transposing the feature map output by the convolution architecture, and retaining more temporal features through the 2D GAP layer;
using an output of the 2D GAP layer as an input of Softmax to classify driver behaviors; and issuing a warning when driver fatigue is detected, wherein
the entire network is a convolutional neural network architecture, and the performance of the model is evaluated using F1-score to reduce the misjudgment of the model during training.

Further, a method of extracting the frame sequence from the video of a driver and processing the frame sequence specifically includes: capturing the video for approximately 5 seconds each time to extract 180 video frames.

Further, the step of performing the spatiotemporal feature learning through the P3D convolution module specifically includes: simulating a 3×3×3 convolution in spatial and temporal domains and decoupling the 3×3×3 convolution in time and space through a P3D architecture that uses a 1×3×3 convolution kernel and a 3×1×1 convolution kernel;

and based on the P3D architecture, cascading P3D architectures with sizes of 32, 64 and 128 to obtain an image feature.

The present invention further proposes a driver fatigue detection system based on combining a P3D CNN and an attention mechanism, including:
a video capture and crop module, configured to provide continuous video stream information of a driver; and
a driver fatigue detection module, configured to detect driver fatigue using the detection method.

Further, the video capture and crop module captures a real-time video stream of upper body information of the driver;

the driver fatigue detection module reserves an interface, and the input of the driver fatigue detection module is video stream data in a correct format.

Additionally, the detection system further includes a display module, configured to display input video image information, output driver fatigue detection state information, and warning information output after the driver fatigue is detected.

3. Advantages

1) The present invention designs a P3D-Attention module. The P3D-Attention module is based on the decoupling of spatial and temporal convolutions by the P3D module, and is respectively integrated with a SAmodule and a DCAM that are adaptive, thereby fully integrating the spatiotemporal features. In this way, the correlation of important channel features is improved and the global correlation of feature maps is increased, thereby improving the performance of fatigue driving prediction.

2) A comparative test performed on the public dataset Yawning Detection Dataset (YawDD) shows that the F1-score of the method of the present invention reaches 99.89%, and the recall rate on the yawning category reaches 100%. On the data set named University of Texas at Arlington Real-Life Drowsiness Dataset (UTA-RLDD), the F1 -score of the method of the present invention reaches 99.64% on the test set, and the recall rate of reaches 100% on the drowsy category.

DETAILED DESCRIPTION

The technical solutions in the embodiments of the present invention are clearly and completely described below with reference to the drawings in the embodiments of the present invention. Apparently, the described embodiments are merely a part rather than all of the embodiments of the present invention. All other embodiments obtained by those skilled in the art based on the embodiments of the present invention without creative efforts shall fall within the scope of protection of the present invention.

The embodiments of the present invention are described in detail below with reference to the drawings.

Embodiment

The present invention proposes a driver fatigue detection method based on combining a pseudo-three-dimensional (P3D) convolutional neural network (CNN) and an attention mechanism, which includes the following steps:

Step 1: A video frame sequence is extracted from a driver's video and processed.

Step 2: Spatiotemporal feature learning is performed through a P3D convolution module.

Step 3: A P3D-Attention module is constructed, and attention is applied on a channel and a feature map through the attention mechanism.

Step 4: A 3D GAP layer is replaced with a 2D GAP layer to obtain more expressive features, and a classification is performed through a Softmax classification layer.

In Step 1, a method of extracting and processing the video frame sequence from the video includes: The video is captured for approximately 5 seconds each time to extract 180 video frames.

Figure 1:
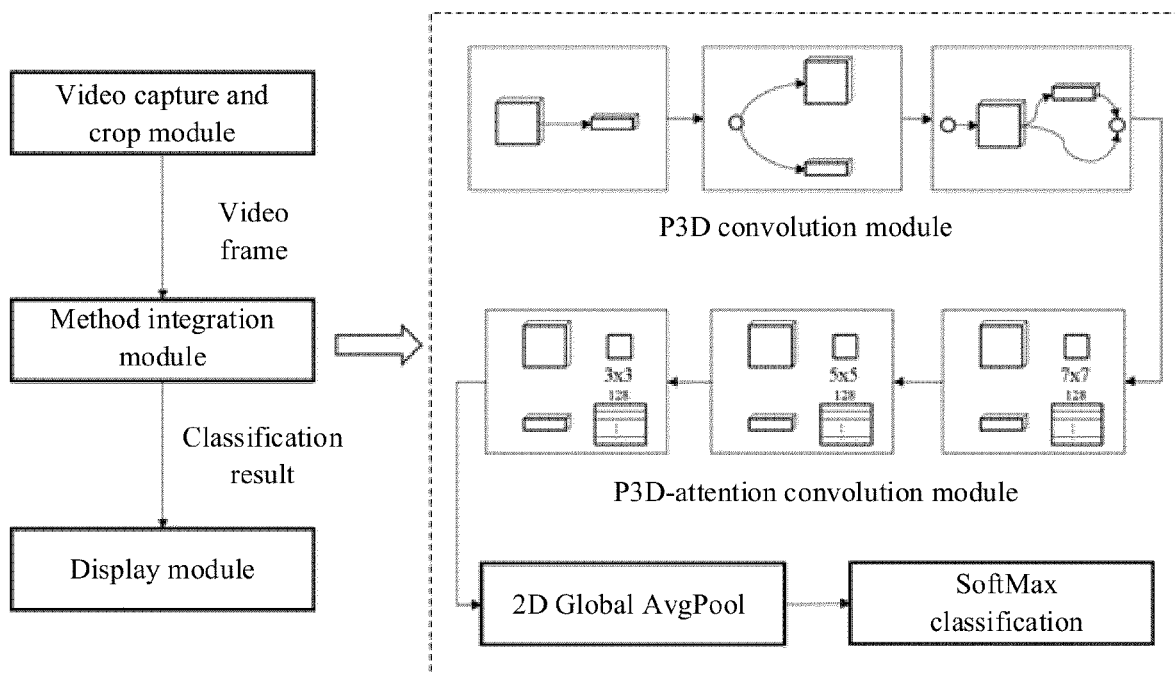
FIG. 1 schematically shows modular design of the driver fatigue detection method based on combining the pseudo-three-dimensional (P3D) convolutional neural network (CNN) and the attention mechanism.
Figure 2:
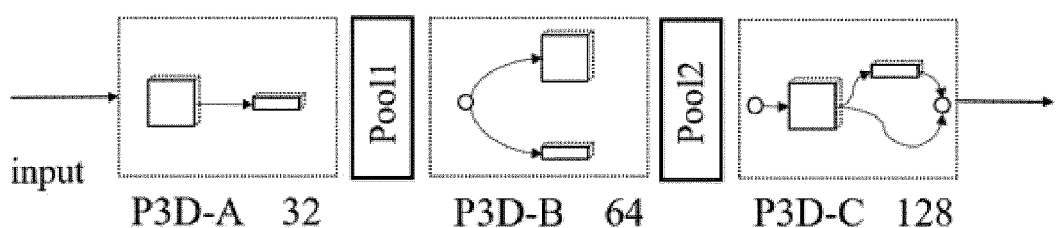
FIG. 2 is a schematic diagram showing the cascading of the three P3D modules.

In Step 2, the step of performing the spatiotemporal feature learning through the P3D convolution module specifically includes: The P3D architecture uses a 1×3×3 convolution kernel and a 3×1×1 convolution kernel to simulate a 3×3×3 convolution in spatial and temporal domains, and decouples the 3×3×3 convolution in time and space. Based on the P3D architecture, P3D architectures with the sizes of 32, 64, and 128 are cascaded to obtain an image feature, and down-sampling is performed through a max pooling layer, as shown in FIG. 2.

In Step 3, the step of constructing the P3D-Attention module specifically includes: On the basis that the P3D module decouples the 3D convolution into a spatial and temporal convolution, the attention module is integrated to design three different P3D-Attention modules, i.e., P3D-Attention-A to P3D-Attention-C to obtain the network model. This module uses a DCAM to make key frames play more important role in classification. In addition, the SA module is introduced to automatically assign different attention to different joint points according to the feature map, attention is paid to positions such as eyes and mouth mentioned in the prior knowledge, and the interference of the background and noise on recognition is removed. The attention mechanism is expressed as:

$$F' = M(F) \otimes F \qquad (1)$$

Figure 3:
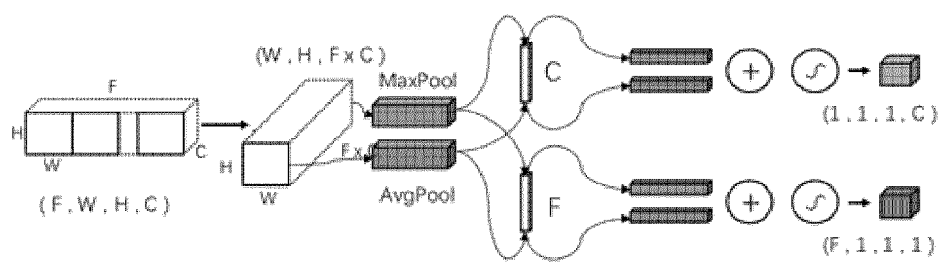
FIG. 3 schematically shows the structure of the channel attention (CA) module.

Step 3.1: In order to adapt to the 3D convolution, a module named DCAM is constructed, as shown in FIG. 3. In order to use the attention mechanism on the 3D convolution, the DCAM of the present invention applies attention between video frames and on the channels of each frame, instead of only on the time frame level. Taking the feature map F ∈ R$^{(F \times H \times W \times C)}$ as an example, F in R represents the number of frames; C represents the number of channels in each frame; H and W represent features under different channels, but the contributions of the channels to the final detection result are not equal. The DCAM learns the weight of $M_c$ ∈ R$^{(F \times 1 \times 1 \times C)}$ to determine the importance of each channel. The attention on the frame and channel is expressed by transposing the feature map with a size of $^{(F, H, W, C)}$ into $^{(H, W, F \times C)}$, embedding $^{(H, W, F \times C)}$ in the 2D SA module, and learning the weights of $M_c$ ∈ R$^{(F \times 1 \times 1 \times 1)}$ and $M_c$ ∈ R$^{(1 \times 1 \times 1 \times C)}$, respectively.

Figure 4:
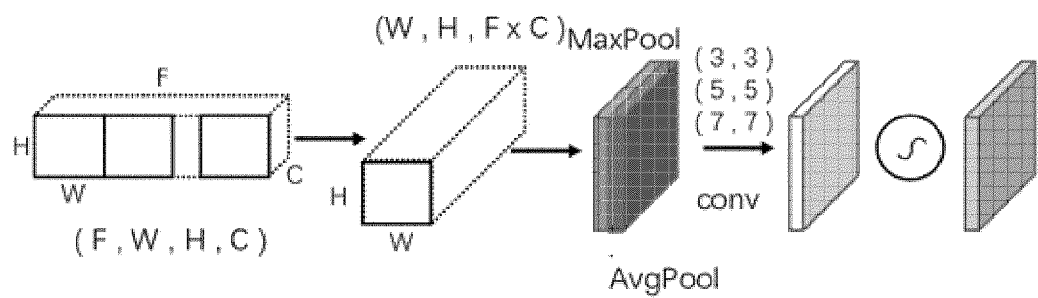
FIG. 4 schematically shows the structure of the spatial attention (SA) module.

Step 3.2: In order to obtain key information, the human visual mechanism pays more attention to the main target rather than the background. Therefore, in the present invention, the weight map of the feature layer in the spatial dimension is obtained through the SA module. Taking the feature map F ∈ R$^{(F \times H \times W \times C)}$ as an example, the SA module learns the weight of $M_s$ ∈ R$^{(1 \times W \times H \times 1)}$ to determine the importance of each feature map. The SA mechanism mainly uses a 2D convolution kernel to obtain a spatial feature weight. During the driving process, the scene in the car hardly changes. Therefore, different from other tasks that need to consider multiple scales, the special scene of fatigue detection can use convolution kernels of different sizes to adapt to convolution features of different depths. The modular architecture is shown in FIG. 4.

Figure 5:
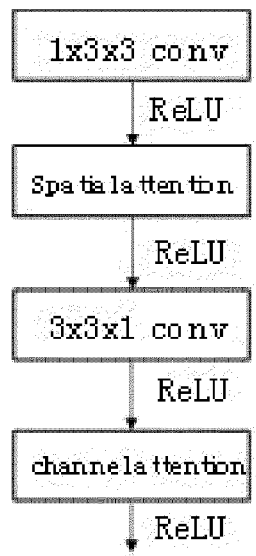
FIG. 5 schematically shows the P3D-Attention-A architecture.
Figure 6:
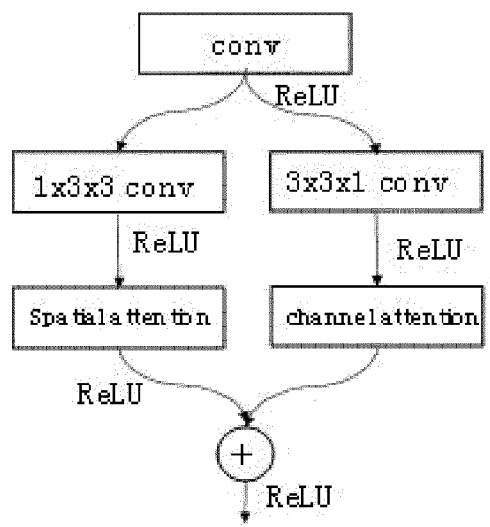
FIG. 6 schematically shows the P3D-Attention-B architecture.
Figure 7:
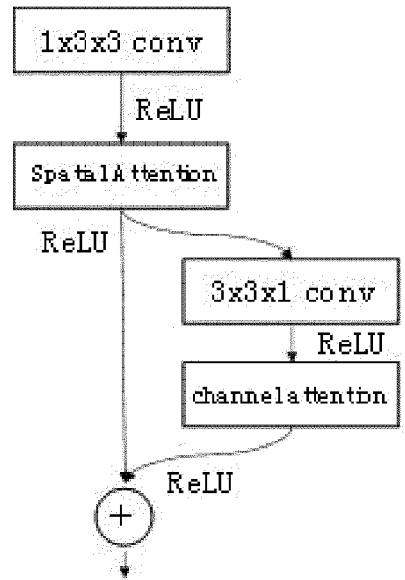
FIG. 7 schematically shows the P3D-Attention-C architecture.

Step 3.3: In performing the fatigue driving detection task, the data input by the model is a continuous frame of a video. On the basis that the P3D module decouples the 3D convolution into a spatial and temporal convolution, the attention module is integrated to design three different P3D-Attention blocks, i.e., P3D-Attention-A to P3D-Attention-C to obtain the network model, as shown in FIGS. 5-7. This module uses the DCAM to make key frames play a more important role in classification. In addition, the SA module is introduced to automatically assign different attention to different joint points according to the feature map, attention is paid to positions such as eyes and mouth mentioned in the prior knowledge, and the interference of the background and noise on recognition is removed.

P3D-Attention-A: Based on the RU, the original P3D-A module first cascades the temporal 1D convolution kernel (T) to the spatial 2D convolution kernel (S) before considering the stacked architecture. Therefore, these two convolution kernels can directly influence each other on the same path, and only the temporal 1D convolution kernel is directly connected to the final output. Since the fatigue detection task does not require excessively deep convolutional layers, the RU is removed and only P3D-A is retained. The SA module is cascaded after S, and then the CA module is cascaded after T to obtain the P3D-Attention-A architecture, as shown in Equation 2:

$$(CA \cdot T \cdot SA \cdot S) \cdot X_t = CA(T(SA(S(X_t)))) = X_{t+1} \quad (2)$$

where, $X_t$ represents an input feature map; $X_{t+1}$ represents an output obtained after the attention mechanism is applied; and $X_t$ and $X_{t+1}$ have the same feature dimension.

P3D-Attention-B: The original P3D-B uses the indirect influence between two convolution kernels, so that the two convolution kernels process convolution features in parallel. After the residual unit is removed, the SA module is cascaded after S, and then the CA module is cascaded after T, which is expressed as follows:

$$(SA \cdot S + CA \cdot T) \cdot X_t = SA(S(X_t) + CA(T(X_t))) = X_{t+1} \quad (3)$$

P3D-Attention-C: The original P3D-C module is a compromise between P3D-A and P3D-B, through which the direct influence between S, T and the final output is simultaneously established. Specifically, in order to achieve a direct connection between S and the final output based on the cascaded P3D-A architecture, the P3D-Attention-C is constructed by introducing the attention module, which is expressed as:

$$(SA \cdot S + CA \cdot T \cdot SA \cdot S) \cdot X_t = SA(S(X_t) + CA(T(SA(S(X_t))))) = X_{t+1} \quad (4)$$

As shown in FIGS. 5 to 7, the P3D-Attention architecture includes P3D-Attention-A, P3D-Attention-B and P3D-Attention-C in sequence.

Figure 8A:
FIG. 8A is a schematic diagram showing the features before being processed by the attention mechanism.
Figure 8B:
FIG. 8B is a schematic diagram showing the features after being processed by the attention mechanism.

Step 3.4: The attention mechanism assigns different weights to different channels and features. After several convolutions, the spatiotemporal feature information of 90 frames is fused into 7 frames. FIG. 8A and FIG. 8b show the comparison between the features on the same channel before and after being processed by the CA mechanism and the SA mechanism, which illustrates that the features of the face and the more important features of the eyes and mouth are more obvious.

Figure 9:
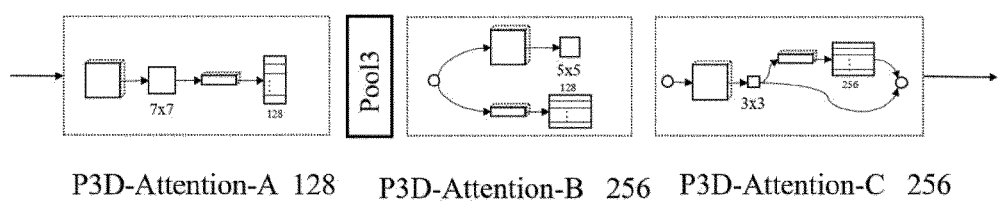
FIG. 9 is a schematic diagram showing the cascaded modules of P3D-Attention.

Step 3.5: Three P3D-Attention modules (with sizes of 128, 256 and 256) are cascaded in the network architecture of the present invention to obtain key features, and the 3D MP layer is cascaded after the P3D-Attention-A module with a size of 128 to perform down sampling, as shown in FIG. 9.

Further, in Step 4, a method of using the 2D GAP layer in the 3D convolution specifically includes: After the video frames are processed by the three P3D modules and three P3D-Attention modules, the time signals are not completely folded. In order to obtain more temporal feature information, the features are transposed and input into the 2D GAP layer instead of using 3D GAP. Finally, the features are input into Softmax and classified.

Step 4.1: The GAP layer is used in order to replace a fully connected layer, reduce the number of parameters, and prevent overfitting. In some embodiments, the fully connected layer is replaced with the GAP layer, the feature map output by the convolution architecture is transposed, and then more temporal features are retained through the 2D GAP layer.

Step 4.2: The output of the 2D GAP layer is used as the input of Softmax to classify driver behaviors. A warning is issued when driver fatigue is detected.

Step 4.3: The entire network is a CNN architecture. In order to reduce the misjudgment of the model during training, the present invention uses F1-score instead of accuracy to evaluate the performance of the model. F1-Score, also known as balanced F score, is defined as a harmonic average of precision P and recall rate R.

Precision (P) refers to a ratio of the number of true positives to the number of positive samples determined by a classifier.

$$P = \frac{TP}{FP + TP} \quad (5)$$

where, TP indicates true positives correctly classified by the classifier; FP indicates false positives incorrectly classified by the classifier.

Recall (R) refers to a ratio of the number of predicted true positives to the total number of positive samples.

$$R = \frac{TP}{TP+FN} \quad (6)$$

where, FN indicates false negatives incorrectly classified by the classifier.

F1-score refers to a harmonic average of P and R.

$$F1 = \frac{2 \times P \times R}{P+R} \quad (7)$$

Further, a driver fatigue detection system based on combining a P3D CNN and an attention mechanism includes a video capture and crop module, a method integration module and a display module. The video capture and crop module is fixedly installed in cameras directly in front of or on the left and right sides of a driver in a cab, and configured to capture a real-time video stream of upper body information of the driver. The real-time video stream is displayed on the display module and is transmitted as input information into the method integration module.

The method integration module is configured to encapsulate the driver fatigue detection method based on combining the P3D CNN and the attention mechanism, and reserve an interface to form a black box. The input of the method integration module is video stream data in a correct format.

The display module is used as an image presentation carrier and configured to display input video image information, output driver fatigue detection state information, and warning information output after the driver fatigue is detected.

The present invention designs a P3D-Attention module. The P3D-Attention module is based on the decoupling of spatial and temporal convolutions by the P3D module, and is respectively integrated with the adaptive SA module and DCAM, thereby fully integrating the spatiotemporal features. Thus, the correlation of important channel features is improved and the global correlation of feature maps is increased, thereby improving the performance of fatigue driving prediction. Compared with the LSTM fusion method using the Inception-V3 model, the model size of the method of the present invention is 42.5 MB, which is 1/9 of that of the LSTM fusion method. The prediction of a 180-frame video (approximately 5 seconds) takes approximately 660 milliseconds, which is approximately 11% of that of the LSTM fusion method.

The above description is merely the specific embodiments of the present invention, but the scope of protection of the present invention is not limited thereto. Any modification or replacement easily conceived by those skilled in the art within the technical scope of the present invention shall fall within the scope of protection of the present invention. Therefore, the scope of protection of the present invention shall be subject to the scope of protection defined by the claims.

What is claimed is:

1. A driver fatigue detection method based on combining a pseudo-three-dimensional (P3D) convolutional neural network (CNN) and an attention mechanism, comprising:
   a step of extracting a frame sequence from a video;
   a step of performing spatiotemporal feature learning through a P3D convolution module;
   a step of constructing a P3D-Attention module, and applying attention on channels and a feature map through the attention mechanism;
   a step of applying attention on a time frame and a space frame through a dual-channel attention model (DCAM) to strengthen key frames, automatically assigning different attention to different joint points according to the feature map, monitoring a position in a prior knowledge, and removing interference of a background and noise on recognition; the attention mechanism being expressed as:

$$F' = M(F) \otimes F \quad (1)$$

wherein, M represents an attention module, ⊗ represents element-wise multiplication of a matrix, and F represents the feature map; and
a classification step.

2. The driver fatigue detection method according to claim 1, wherein
the DCAM applies the attention between frames of the video and on the channels of each frame of the frames;
the feature map F is expressed as $F \in R^{(F \times H \times W \times C)}$, wherein R represents a real number, F in R represents a number of the frames; C represents a number of the channels in the each frame; H and W represent features under different channels of the channels;
a weight of $M_c \in R^{(F \times 1 \times 1 \times C)}$ is learned to determine an importance of the each channel; wherein $M_c$ represents the DCAM; the feature map with a size of (F,H,W,C) is transposed into (H,W,F×C), and (H,W,F×C) is combined with a two-dimensional (2D) spatial attention (SA) module; and
weights of $M_c \in R^{(F \times 1 \times 1 \times 1)}$ and $M_c \in R^{(1 \times 1 \times 1 \times C)}$ are respectively learned to express the attention on the frames and the channels.

3. The driver fatigue detection method according to claim 2, wherein
the 2D SA module uses a 2D convolution kernel to obtain a weight map of a feature layer in a spatial dimension; and
a SA module of $F \in R^{(F \times H \times W \times C)}$ learns a weight of $M_s \in R^{(1 \times W \times H \times 1)}$ to determine an importance of the feature map, wherein $M_s$ represents the SA module.

4. The driver fatigue detection method according to claim 1, wherein
after the P3D convolution module decouples a 3D convolution into a spatial and temporal convolution, the attention module is divided into three different P3D-Attention modules to obtain a network model, and the three different P3D-Attention modules comprise a P3D-Attention-A module, a P3D-Attention-B module and a P3D-Attention-C module; wherein
a temporal one-dimensional (1D) convolution kernel T is cascaded to a spatial 2D convolution kernel S, a SA module is cascaded after the spatial 2D convolution kernel S, and a channel attention (CA) module is cascaded after the temporal 1D convolution kernel T, to obtain a P3D-Attention-A architecture; and the temporal 1D convolution kernel T is directly connected to a final output to construct the P3D-Attention-A module expressed as:

$$(CA \cdot T \cdot SA \cdot S) \cdot X_t = CA(T(SA(S(X_t)))) = X_{t+1} \quad (2)$$

wherein, $X_t$ represents an input feature map; $X_{t+1}$ represents an output obtained after the attention mechanism is applied; $X_t$ and $X_{t+1}$ have one feature dimension;

an original P3D-B module uses an indirect influence between the spatial 2D convolution kernel S and the temporal 1D convolution kernel T, and the spatial 2D convolution kernel S and the temporal 1D convolution kernel T process convolution features in parallel; after a residual unit is removed, the SA module is cascaded after the spatial 2D convolution kernel S, and then the CA module is cascaded after the temporal 1D convolution kernel T, to construct the P3D-Attention-B module expressed as:

$$(SA \cdot S + CA \cdot T) \cdot X_t = SA(S(X_t) + CA(T(X_t))) = X_{t+1} \quad (3)$$

an original P3D-C module is a compromise between a P3D-A module and the original P3D-B module, and a direct influence between the spatial 2D convolution kernel S, the temporal 1D convolution kernel T and the final output is simultaneously established through the original P3D-C module; to obtain a direct connection between the spatial 2D convolution kernel S and the final output based on a cascaded P3D-A architecture of the P3D-A module, the attention module is introduced to construct the P3D-Attention-C module expressed as follows:

$$(SA \cdot S + CA \cdot T \cdot SA \cdot S) \cdot X_t = SA(S(X_t) + CA(T(SA(S(X_t))))) = X_{t+1} \quad (4)$$

and the attention mechanism assigns different weights to different channels and features; after a plurality convolutions of spatial and temporal feature information, the spatial and temporal feature information is fused to obtain key features, and a 3D max pooling layer is cascaded after the P3D-Attention-A module for down sampling.

5. The driver fatigue detection method according to claim 1, wherein
the classification step comprises:
introducing a 2D global average pooling (GAP) layer after the P3D-Attention module; wherein after frames of the video pass through three P3D modules and three P3D-Attention modules, features are input into the 2D GAP layer after being transposed, and then the features are input into Softmax and classified.

6. The driver fatigue detection method according to claim 5, wherein
the classification step specifically comprises:
replacing a fully connected layer with a GAP layer; transposing the feature map output by a convolution architecture, and retaining additional temporal features through the 2D GAP layer;
using an output of the 2D GAP layer as an input of the Softmax to classify driver behaviors; and issuing a warning when driver fatigue is detected; wherein an entire network is a convolutional neural network architecture, and a performance of a method integration module is evaluated using F1-score to reduce a misjudgment of the method integration module during training.

7. The driver fatigue detection method according to claim 1, wherein
a method of extracting the frame sequence from the video of a driver and processing the frame sequence specifically comprises: capturing the video for approximately 5 seconds each time to extract 180 video frames.

8. The driver fatigue detection method according to claim 1, wherein
the step of performing the spatiotemporal feature learning through the P3D convolution module specifically comprises:
simulating a 3×3×3 convolution in spatial and temporal domains and decoupling the 3×3×3 convolution in time and space through a P3D architecture using a 1×3×3 convolution kernel and a 3×1×1 convolution kernel; and based on the P3D architecture, cascading a plurality of P3D architectures with sizes of 32, 64 and 128 to obtain an image feature.

9. A driver fatigue detection system based on combining a P3D CNN and an attention mechanism, comprising:
a video capture and crop module, and
a driver fatigue detection module; wherein
the video capture and crop module is configured to provide continuous video stream information of a driver; and
the driver fatigue detection module is configured to detect driver fatigue using the driver fatigue detection method according to claim 1.

10. The driver fatigue detection system according to claim 9, wherein
the video capture and crop module captures a real-time video stream of upper body information of the driver;
the driver fatigue detection module reserves an interface, and an input of the driver fatigue detection module is video stream data in a preset format; and
the driver fatigue detection system further comprises a display module, wherein the display module is configured to display an input video image information, an output driver fatigue detection state information, and a warning information output after the driver fatigue is detected.

11. The driver fatigue detection system according to claim 9, wherein
the DCAM applies the attention between frames of the video and on the channels of each frame of the frames;
the feature map F is expressed as $F \in R^{(F \times H \times W \times C)}$, wherein R represents a real number, F in R represents a number of the frames; C represents a number of the channels in the each frame; H and W represent features under different channels of the channels;
a weight of $M_c \in R^{(F \times 1 \times 1 \times C)}$ is learned to determine an importance of the each channel; wherein $M_c$ represents the DCAM; the feature map with a size of (F,H,W,C) is transposed into (H,W,F×C), and (H,W,F×C) is combined with a two-dimensional (2D) spatial attention (SA) module; and
weights of $M_c \in R^{(F \times 1 \times 1 \times 1)}$ and $M_c \in R^{(1 \times 1 \times 1 \times C)}$ are respectively learned to express the attention on the frames and the channels.

12. The driver fatigue detection system according to claim 11, wherein
the 2D SA module uses a 2D convolution kernel to obtain a weight map of a feature layer in a spatial dimension; and
a SA module of $F \in R^{(F \times H \times \Pi \times C)}$ learns a weight of $M_s \in R^{(1 \times W \times H \times 1)}$ to determine an importance of the feature map, wherein $M_s$ represents the SA module.

13. The driver fatigue detection system according to claim 12, wherein
the video capture and crop module captures a real-time video stream of upper body information of the driver;

the driver fatigue detection module reserves an interface, and an input of the driver fatigue detection module is video stream data in a preset format; and the driver fatigue detection system further comprises a display module, wherein the display module is configured to display an input video image information, an output driver fatigue detection state information, and a warning information output after the driver fatigue is detected.

14. The driver fatigue detection system according to claim 11, wherein the video capture and crop module captures a real-time video stream of upper body information of the driver;

the driver fatigue detection module reserves an interface, and an input of the driver fatigue detection module is video stream data in a preset format; and the driver fatigue detection system further comprises a display module, wherein the display module is configured to display an input video image information, an output driver fatigue detection state information, and a warning information output after the driver fatigue is detected.

15. The driver fatigue detection system according to claim 9, wherein after the P3D convolution module decouples a 3D convolution into a spatial and temporal convolution, the attention module is divided into three different P3D-Attention modules to obtain a network model, and the three different P3D-Attention modules comprise a P3D-Attention-A module, a P3D-Attention-B module and a P3D-Attention-C module; wherein a temporal one-dimensional (1D) convolution kernel T is cascaded to a spatial 2D convolution kernel S, a SA module is cascaded after the spatial 2D convolution kernel S, and a channel attention (CA) module is cascaded after the temporal 1D convolution kernel T, to obtain a P3D-Attention-A architecture; and the temporal 1D convolution kernel T is directly connected to a final output to construct the P3D-Attention-A module expressed as:

$$(CA \cdot T \cdot SA \cdot S) \cdot X_t = CA\big(T\big(SA\big(S(X_t)\big)\big)\big) = X_{t+1} \quad (2)$$

wherein, $X_t$ represents an input feature map; $X_{t+1}$ represents an output obtained after the attention mechanism is applied; $X_t$ and $X_{t+1}$ have one feature dimension;

an original P3D-B module uses an indirect influence between the spatial 2D convolution kernel S and the temporal 1D convolution kernel T, and the spatial 2D convolution kernel S and the temporal 1D convolution kernel T process convolution features in parallel; after a residual unit is removed, the SA module is cascaded after the spatial 2D convolution kernel S, and then the CA module is cascaded after the temporal 1D convolution kernel T, to construct the P3D-Attention-B module expressed as:

$$(SA \cdot S + CA \cdot T) \cdot X_t = SA\big(S(X_t)\big) + CA\big(T(\ X_t)\big)\big) = X_{t+1} \quad (3)$$

an original P3D-C module is a compromise between a P3D-A module and the original P3D-B module, and a direct influence between the spatial 2D convolution kernel S, the temporal 1D convolution kernel T and the final output is simultaneously established through the original P3D-C module; to obtain a direct connection between the spatial 2D convolution kernel S and the final output based on a cascaded P3D-A architecture of the P3D-A module, the attention module is introduced to construct the P3D-Attention-C module expressed as follows:

$$(SA \cdot S + CA \cdot T \cdot SA \cdot S) \cdot X_t = SA\big(S(X_t)\big) + CA\big(T\big(SA\big(S(X_t)\big)\big)\big) = X_{t+1} \quad (4)$$

and the attention mechanism assigns different weights to different channels and features; after a plurality convolutions of spatial and temporal feature information, the spatial and temporal feature information is fused to obtain key features, and a 3D max pooling layer is cascaded after the P3D-Attention-A module for down sampling.

16. The driver fatigue detection system according to claim 15, wherein the video capture and crop module captures a real-time video stream of upper body information of the driver;

the driver fatigue detection module reserves an interface, and an input of the driver fatigue detection module is video stream data in a preset format; and the driver fatigue detection system further comprises a display module, wherein the display module is configured to display an input video image information, an output driver fatigue detection state information, and a warning information output after the driver fatigue is detected.

17. The driver fatigue detection system according to claim 9, wherein the classification step comprises:

introducing a 2D global average pooling (GAP) layer after the P3D-Attention module; wherein after frames of the video pass through three P3D modules and three P3D-Attention modules, features are input into the 2D GAP layer after being transposed, and then the features are input into Softmax and classified.

18. The driver fatigue detection system according to claim 17, wherein the classification step specifically comprises:

replacing a fully connected layer with a GAP layer; transposing the feature map output by a convolution architecture, and retaining additional temporal features through the 2D GAP layer;

using an output of the 2D GAP layer as an input of the Softmax to classify driver behaviors; and issuing a warning when driver fatigue is detected; wherein an entire network is a convolutional neural network architecture, and a performance of a method integration module is evaluated using F1-score to reduce a misjudgment of the method integration module during training.

19. The driver fatigue detection system according to claim 9, wherein a method of extracting the frame sequence from the video of a driver and processing the frame sequence specifically comprises: capturing the video for approximately 5 seconds each time to extract 180 video frames.

20. The driver fatigue detection system according to claim 9, wherein the step of performing the spatiotemporal feature learning through the P3D convolution module specifically comprises:

simulating a 3×3×3 convolution in spatial and temporal domains and decoupling the 3×3×3 convolution in time and space through a P3D architecture using a 1×3×3 convolution kernel and a 3×1×1 convolution kernel; and based on the P3D architecture, cascading a plurality of P3D architectures with sizes of 32, 64 and 128 to obtain an image feature.

* * * * *